United States Patent
McCaffrey et al.

(10) Patent No.: US 7,324,145 B2
(45) Date of Patent: Jan. 29, 2008

(54) MULTIPLEXING PRISM CMOS IMAGERS TO A SINGLE DATA BUS

(75) Inventors: Nathaniel Joseph McCaffrey, Stockton, NJ (US); Donald Jon Sauer, Pismo Beach, CA (US)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 842 days.

(21) Appl. No.: 10/766,648

(22) Filed: Jan. 27, 2004

(65) Prior Publication Data

US 2004/0189840 A1    Sep. 30, 2004

Related U.S. Application Data

(60) Provisional application No. 60/450,086, filed on Feb. 26, 2003.

(51) Int. Cl.
*H04N 3/14* (2006.01)
*H04N 5/335* (2006.01)

(52) U.S. Cl. ............... 348/302; 348/308; 348/294
(58) Field of Classification Search ........... 348/343, 348/311, 294, 302, 281
See application file for complete search history.

(56) References Cited

U.S. PATENT DOCUMENTS

| | | | |
|---|---|---|---|
| 5,134,488 A * | 7/1992 | Sauer ................... 348/294 |
| 5,719,626 A * | 2/1998 | Yoneyama et al. ......... 348/301 |
| 5,973,311 A * | 10/1999 | Sauer et al. ............. 250/208.1 |
| 6,091,449 A * | 7/2000 | Matsunaga et al. ........ 348/308 |
| 6,176,429 B1 | 1/2001 | Reddersen et al. .... 235/462.25 |
| 6,505,003 B1 | 1/2003 | Malloy Desormeaux .... 396/429 |
| 6,507,365 B1 * | 1/2003 | Nakamura et al. ........... 348/296 |

\* cited by examiner

*Primary Examiner*—Tuan Ho
*Assistant Examiner*—Asif Khokhar
(74) *Attorney, Agent, or Firm*—Saile Ackerman LLC; Stephen B. Ackerman

(57) ABSTRACT

A new multiple imager array device is achieved. The device comprises, first, a bi-directional bus. An array of imagers is arranged in n rows and m columns. The n and m are positive integers. Each imager is connected to the bi-directional bus. A line of bits of any imager is accessible by a line address. Each imager has a Vmode input and an output enable input. The Vmode input and the output enable input must be enabled to allow accessing. A first multiplexer has an input and a plurality of outputs. The input is connected to a column counter. Each output is connected to the output enable input of one of the imagers. A second-multiplexer has an input and a plurality of outputs. The input is connected to a row counter. Each output is connected to the Vmode input of each imager in one of the rows.

25 Claims, 3 Drawing Sheets

MULTIPLEXING PRISM CMOS IMAGERS TO A SINGLE DATA BUS

This application claims priority to U.S. Provisional Application Ser. No. 60/450,086 filed on Feb. 26, 2003, and herein incorporated by reference.

BACKGROUND OF THE INVENTION

1. Field of the Invention

The invention relates to solid state optical imagers, and, more particularly, to a method to address a reconfigurable array of imagers using a single fixed size data bus.

2. Description of the Prior Art

Solid state imagers are used in many applications. Typically, these imagers comprise fixed arrays of pixels. It is difficult to reconfigure these imagers into large arrays or into higher resolution arrays. This is especially true when attempting to create high-resolution arrays using fixed data bus architecture.

Several prior art inventions relate to optical imaging using CMOS image devices. U.S. Pat. No. 6,176,429 B1 to Redderson et al describes an optical reader using a photosensor that may comprise a multidimensional CMOS array. U.S. Pat. No. 6,505,003 B1 to Malloy Desormeaux discloses a hybrid camera using a CMOS image sensor.

SUMMARY OF THE INVENTION

A principal object of the present invention is to provide an effective and very manufacturable method and device to access an array of imagers.

A further object of the present invention is to provide a method whereby a plurality of imagers can be used cooperatively to improve image resolution or to provide a single, large resolution image.

A yet further object of the present invention is to provide a means to reconfigure an n x m array of imagers using a single data bus architecture.

In accordance with the objects of this invention, a method of addressing imagers is achieved. The method comprises, first, providing a bi-directional bus. An array of imagers is arranged in n rows and m columns wherein the n and m are positive integers. Each imager is connected to the bi-directional bus. Each imager has a Vmode terminal. Each imager has a select terminal. Each imager can deliver a signal to the bi-directional bus only when a first selecting signal is applied to a Vmode terminal of that imager and a second selecting signal is applied to a select terminal of that imager simultaneously. A first multiplexer has a vertical select input and n outputs. Each of the n outputs is connected to one of the Vmode terminals of the imagers. A second multiplexer has a horizontal select input and n×m outputs. Each output is connected to the select terminal of one of the imagers. A vertical input signal is applied to the vertical select input of the first multiplexer thereby producing the first selecting signal at one of the Vmode output lines. A horizontal input signal is applied to the horizontal select input of the second multiplexer thereby sequentially producing the second selecting signal at the select terminal of one of the imagers.

Also in accordance with the objects of this invention, a method of accessing an imager array is achieved. The method comprises, first, providing a bi-directional bus. An array of imagers is arranged in n rows and m columns. The n and m are positive integers. Each imager is connected to the bi-directional bus. A line of bits of any imager is accessible by a line address. A column counter, a row counter, and the line address are initialized to zero. All of the array is accessed. The accessing comprises further steps of, first, accessing one line of one the imager corresponding to the line address, the column counter, and the row counter. Thereafter the column counter is tested for equality to m−1. If not equal, the column counter is incremented and the step of accessing one line is repeated. If equal, the column counter is reset. Thereafter the line address is tested for equality to total lines in each imager. If not equal, the line address is incremented and the step of accessing one line is repeated. If equal, the line address is reset. Thereafter the row counter is tested for equality to n−1. If not equal, the row counter is incremented and the step of accessing one line is repeated. If equal, the step of accessing all is completed.

Also in accordance with the objects of this invention, a multiple imager array device is achieved. The device comprises, first, a bi-directional bus. An array of imagers is arranged in n rows and m columns. The n and m are positive integers. Each imager is connected to the bi-directional bus. A line of bits of any imager is accessible by a line address. Each imager has a Vmode input and an output enable input. The Vmode input and the output enable input must be enabled to allow accessing. A first multiplexer has an input and a plurality of outputs. The input is connected to a column counter. Each output is connected to the output enable input of one of the imagers. A second multiplexer has an input and a plurality of outputs. The input is connected to a row counter. Each output is connected to the Vmode input of each imager in one of the rows.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present invention disclose a method and a device for accessing an imager array having a single, bi-directional bus. It should be clear to those experienced in the art that the present invention can be applied and extended without deviating from the scope of the present invention.

Figure 1:
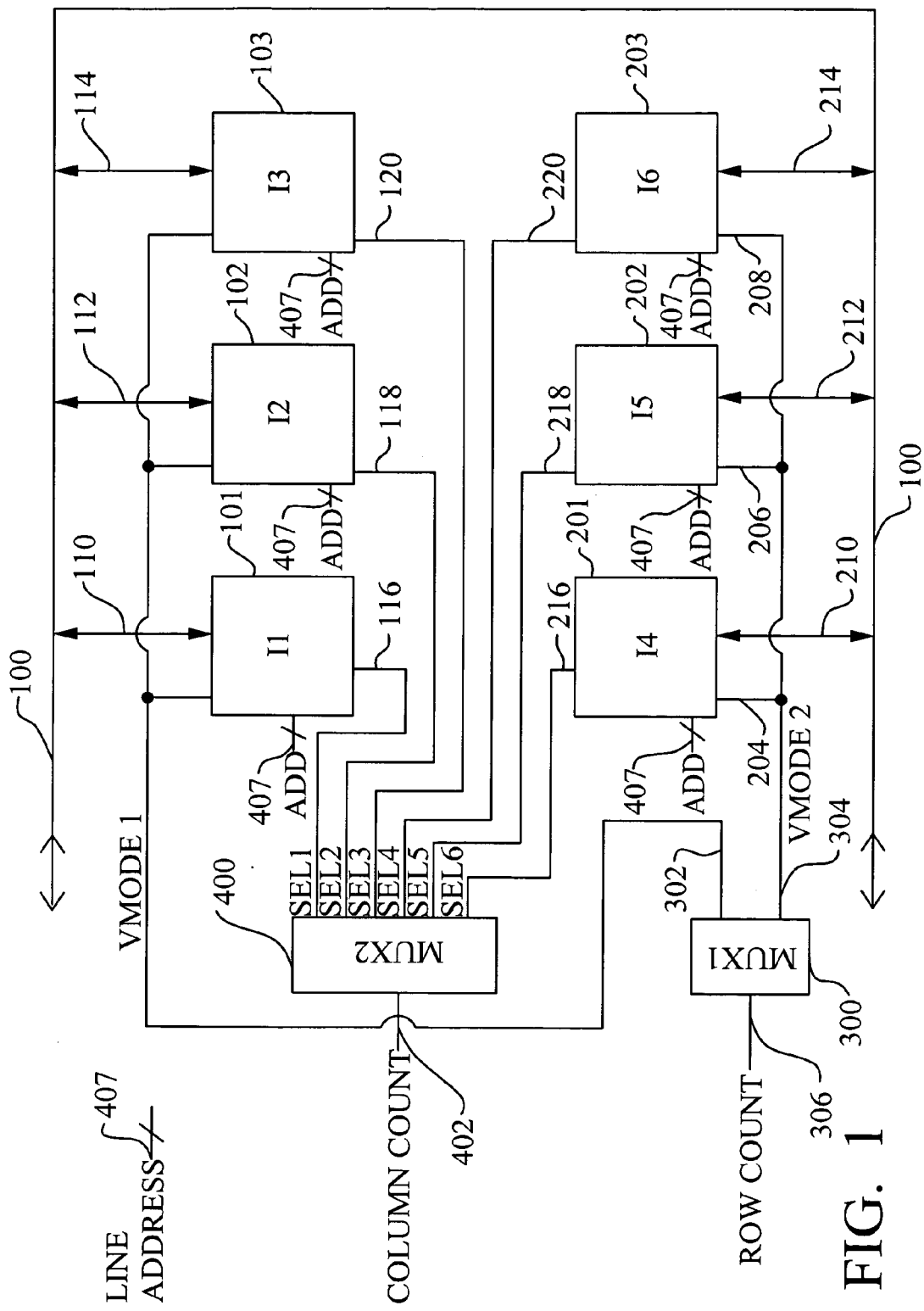
FIG. 1 illustrates a first preferred embodiment of the present invention showing a 2×3 array of imagers connected to a single, bi-directional bus.
Figure 2:
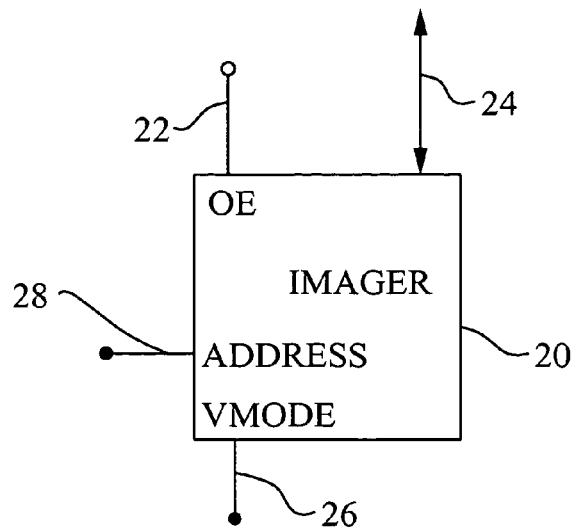
FIG. 2 illustrates a block diagram of a single imager.

Referring now to FIG. 1, the first preferred embodiment of the present invention is illustrated. Several important features of the present invention are shown and discussed below. This invention relates to an n×m array of imagers connected to a single bi-directional bus. As an example, a 2×3 array of six imagers 101, 102, 103, 210, 202, and 203 with each of the imagers connected to a single bi-directional bus 100 is shown in FIG. 1. An example of a single imager 20 is shown in FIG. 2. This imager has an output port 24 for connection to the bus. In this imager 20 a signal at the Vmode terminal 22 controls whether or not the imager 20 is connected to the bus. A select terminal 26 selects a particular imager 20. An address bus ADDRESS 28 is used to select which row or line of bits is accessed. For the imager to deliver a signal to the bus both the Vmode terminal 20 and the select terminal 26 must be activated.

Returning again to FIG. 1, the six imagers are arranged in an array of two rows of three imagers in each row. Imagers 101, 102, and 103 are in the first row and have output ports 110, 112, and 114 connected to the bi-directional bus 100. Imagers 201, 202, and 203 are in the second row and have output ports 210, 212, and 214 connected to the bi-directional bus 100. A vertical select line 306 is connected to a first multiplexer 300. The first multiplexer 300 has a Vmode output line for each row of imagers.

In this example, there are two rows of imagers and the first multiplexer 300 has a first Vmode line 302 and a second Vmode line 304. The first Vmode line 302 is connected to the Vmode terminals 104, 106, and 108 of the imagers 101, 102, and 103 in the first row. The second Vmode line 304 is connected to the Vmode terminals 204, 206, and 208 of the imagers 201, 202, and 203 in the first row. If there were more imagers in each row of the array, the Vmode terminals of all the imagers in the first row would be connected to the first Vmode line, and the Vmode terminals of all the imagers in the second row would be connected to the second Vmode line. If there were additional rows of imagers, then the first multiplexer 300 would have a Vmode line for each row of imagers in the array. The input to the first multiplexer 300 is a vertical select line 306.

A horizontal select line, COLUMN COUNT, 402 is connected to a second multiplexer 400 which has an output line for each imager in the array. One of the output lines of the second multiplexer 400 is connected to the select terminal 116, 118, 120, 216, 218, and 220 of each imager 101, 102, 103, 201, 202, and 202 in the array. With this arrangement, the vertical select line, ROW COUNT, 306 causes the multiplexer to activate either the first Vmode line 302 or the second Vmode line 304. The horizontal select line then causes the second multiplexer 400 to activate the select terminal of a particular imager so that the signal from that imager is sent to the bi-directional bus 100.

In an n×m array of imagers, the vertical address selects the n imagers in row m. The input to the second multiplexer 400 then causes an output of the second multiplexer 400 to enable the output port of a single imager to be active and the signal of that imager to be transferred to the bi-directional bus 100. By using the vertical select address as the write enable pulse, an entire row is selected and transferred to n horizontal registers. This line is read out serially.

This method provides a means to reconfigure the array of imagers n×m without bounds while maintaining the same data bus architecture. This application could be implemented with slightly overlapping optics to provide a seamless combining of imager data to provide a single, large resolution image. This has application in fixed object plane imaging which includes X-ray imagers and facsimile. Also, several remote sources could be multiplexed onto a single display for security applications.

Referring again to FIG. 1, the first preferred embodiment of the present invention may be further described. The device comprises, first, a bi-directional bus 100. An array of imagers I1-I6 101, 102, 103, 201, 202, and 203 is arranged in n rows and m columns. In this case, n=2 rows and m=3 columns. Each imager is connected 110, 112, 114, 210, 212, and 214 to the bi-directional bus 100. A line of bits of any imager is accessible by a line address LINE ADDRESS 407. Each imager 101, 102, 103, 201, 202, and 203 has a Vmode input and an output enable input. The Vmode input and the output enable input must be enabled to allow accessing. A first multiplexer MUX2 400 has an input 402 and a plurality of outputs SEL1-SEL6 116, 118, 120, 216, 218, and 220. The input is connected to a column counter COLUMN COUNT 402. Each output SEL1-SEL6 is connected to the output enable input of one of the imagers I1-I6. A second multiplexer MUX1 300 has an input 306 and a plurality of outputs 302 and 304. The input is connected to a row counter ROW COUNT 306. Each output VMODE1 302 and VMODE2 304 is connected to the Vmode input of each imager in one of the rows.

Figure 3:
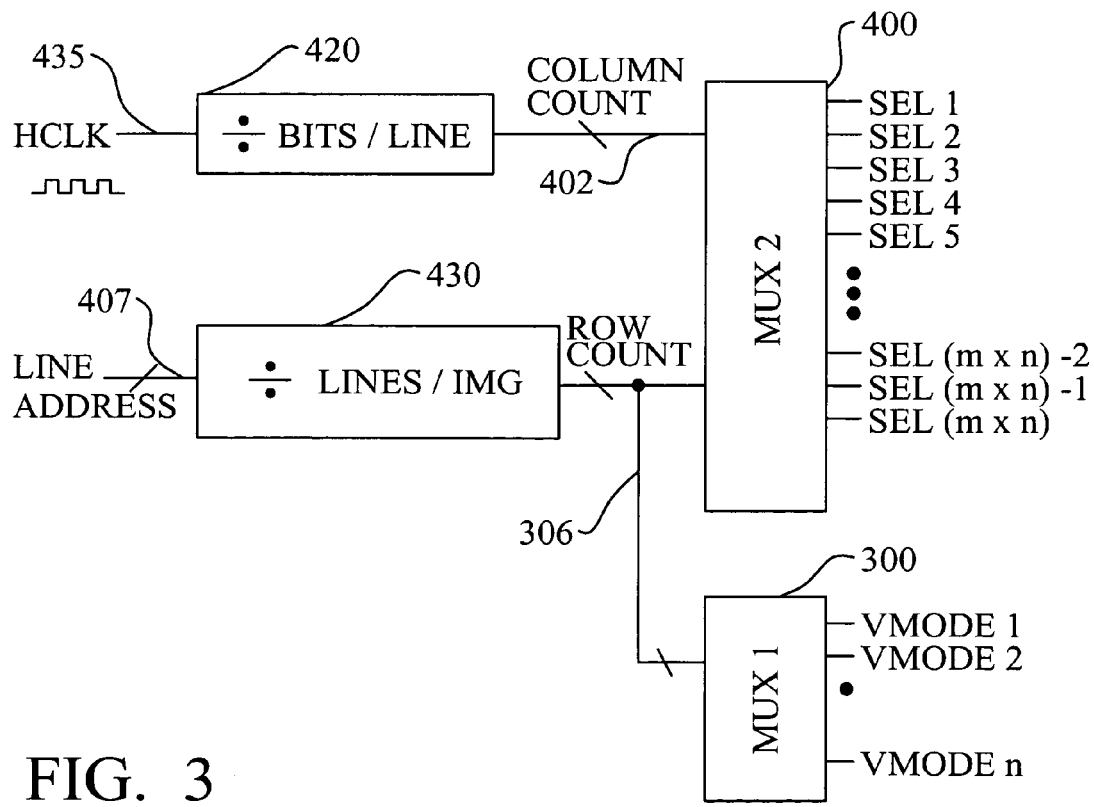
FIG. 3 illustrates a second preferred embodiment of the present invention showing how the column count and the row count are generated from the horizontal clock and the line address, respectively and showing how the select signals (SEL1:SEL(m×n)) are generated from the sum of the column count and row count signals.

Referring now to FIG. 3, a second preferred embodiment of the present invention is illustrated. This embodiment shows how the column counter COLUMN COUNT 402 and the row counter ROW COUNT 306 are preferably generated. The horizontal clock HCLK 435 comprises a synchronous clock used to clock data into or out from the imager devices in the array. In the preferred embodiment example, the HCLK 435 comprises a 36 MHz signal. A first divider 420 is used to divide the HCLK 435 by the number of horizontal bits per line in each imager. For example, if the imagers are each 640 bits/line×480 lines, then the HCLK 435 is divided by 640 to create the signal COLUMN COUNT 402. The COLUMN COUNT 402 is a multiple bit signal that effectively counts each time an imager is read by the HCLK signal. In the preferred embodiment, the bi-directional bus clocks data into or out from the imager in serial fashion. If the imager has 640 horizontal bits per line, then it requires 640 clock cycles to clock in or out the data bits for that single line in that single imager. Therefore, during clock cycles 0 through 639, the COLUMN COUNT=0, during clock cycles 640 through 1279, the COLUMN COUNT=1, and during clock cycles 1280 through 1919, the COLUMN COUNT=2. To count from 0 to 2, COLUMN COUNT would therefore have to be two bits wide. Moreover, during COLUMN COUNT=0, the first column of imagers is accessed, during COLUMN COUNT=1, the second column of imagers is accessed, and during COLUMN COUNT=2, the third column of imagers is accessed.

The LINE ADDRESS signal 407 comprises the address bus used to select which row of any imager is read/written. The LINE ADDRESS signal 407 is divided by the number of lines (rows) in each imager. In the preferred case, this means that the LINE ADDRESS signal is divided by 480 to create the ROW COUNT 306. Therefore, the LINE ADDRESS between 0 and 479 reads the top row of imagers, the LINE ADDRESS between 480 and 959 reads the bottom row of imagers. Since there are only two rows of imagers in the preferred embodiment, the ROW COUNT 306 is only 0 or 1 and can be carried by a single line.

In this preferred embodiment, the COLUMN COUNT 402 and the ROW COUNT 306 are both input into the first multiplexer MUX2 400. The combined sum can be written COLUMN COUNT:ROW COUNT as a bus input to the MUX2 400. The outputs of the first multiplexer MUX2 400 are the selection signals SEL1 to SEL(m×n) in the general case. The ROW COUNT signal is used by the second multiplexer MUX1 300 to generate the Vmode signals VMODE1 to VMODEn in the general case.

It is found that this approach can provide a means to extend the m×n array of imagers, without bounds, while maintaining the same data bus architecture. For example, using the m=3 array, the maximum frame rate would be 30/m Hz. Therefore, a 3×2 array with a minimal overlap would provide a 2076×1008 resolution at 15 frames/second. Further, this application could be implemented with slightly overlapping optics to provide seamless combining of imager data and to provide a single, large resolution image. This has application in fixed object plane imaging which may include X-ray imagers and facsimile. Also, several remote sources could be multiplexed onto a single display for security applications.

Figure 4:
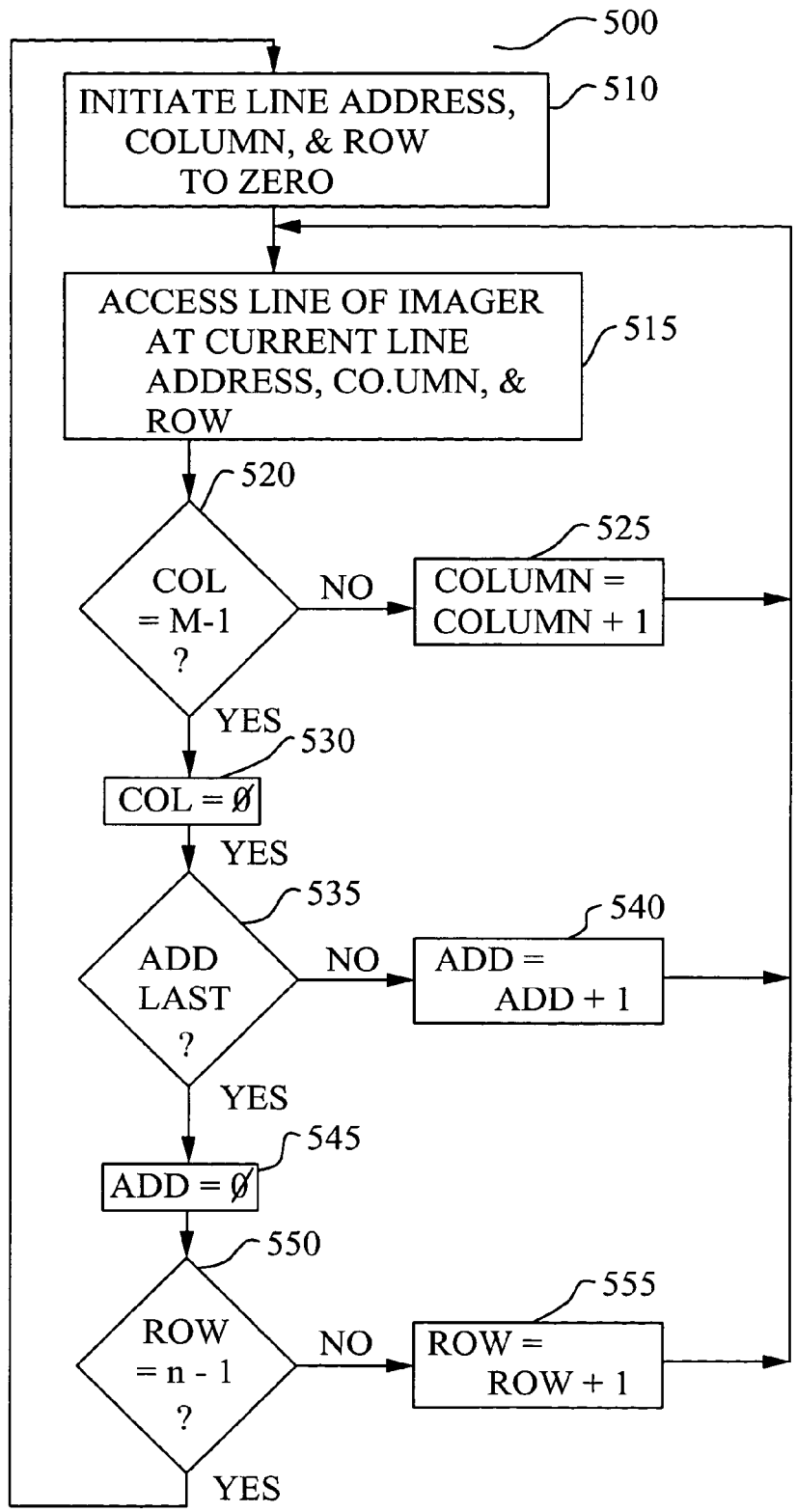
FIG. 4 illustrates a third preferred embodiment of the present invention showing a method to access an imager array having a single, bi-directional bus.

Referring now to FIG. 4, a third preferred embodiment of the present invention is illustrated. The method 500 of accessing (read/write) imager data in an imager array is shown. The method comprises initializing the column counter, the row counter, and the line address to zero in step 510. One line of one the imager is accessed corresponding to the line address, the column counter, and the row counter in step 515. Thereafter the column counter is tested for equality to m−1 in step 520. If not equal, the column counter is incremented and the step of accessing one line is repeated in step 525. If equal, the column counter is reset in step 530. Thereafter the line address is tested for equality to total lines in each imager in step 535. If not equal, the line address is incremented and the step of accessing one line is repeated in step 540. If equal, the line address is reset in step 545. Thereafter the row counter is tested for equality to n−1 in step 550. If not equal, the row counter is incremented and the step of accessing one line is repeated in step 555. If equal, the step of accessing all is completed.

The advantages of the present invention may now be summarized. An effective and very manufacturable method and device to access an array of imagers is achieved. A method whereby a plurality of imagers can be used cooperatively to improve image resolution or to provide a single, large resolution image is achieved. A means to reconfigure an n×m array of imagers using a single data bus architecture is provided.

As shown in the preferred embodiments, the novel method and device of the present invention provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method of addressing imagers, comprising:
providing a bi-directional bus;
providing an array of imagers arranged in n rows and m columns wherein said n and m are positive integers, wherein each said imager is connected to said bi-directional bus, wherein each said imager has a Vmode terminal, wherein each said imager has a select terminal, and wherein each said imager can deliver a signal to said bi-directional bus only when a first selecting signal is applied to a Vmode terminal of that said imager and a second selecting signal is applied to a select terminal of that said imager simultaneously;
providing a first multiplexer having a vertical select input and n outputs, wherein each of said n outputs is connected to one of said Vmode terminals of said imagers;
providing a second multiplexer having a horizontal select input and n×m outputs wherein each said output is connected to said select terminal of one of said imagers;
applying a vertical input signal to said vertical select input of said first multiplexer thereby producing said first selecting signal at one of said Vmode output lines; and
applying a horizontal input signal to said horizontal select input of said second multiplexer thereby sequentially producing said second selecting signal at said select terminal of one of said imagers.

2. A method of accessing an imager array, said method comprising:
providing a bi-directional bus;
providing an array of imagers arranged in n rows and m columns wherein said n and m are positive integers, wherein each said imager is connected to said bi-directional bus, and wherein a line of bits of any said imager is accessible by a line address;
initializing a column counter, a row counter, and said line address to zero; and
accessing all of said array wherein said accessing comprises further steps of:
accessing one line of one said imager corresponding to said line address, said column counter, and said row counter;
thereafter testing said column counter for equality to m−1 wherein, if not equal, said column counter is incremented and said step of accessing one line is repeated and wherein, if equal, said column counter is reset;
thereafter testing said line address for equality to total lines in each said imager wherein, if not equal, said line address is incremented and said step of accessing one line is repeated, and wherein, if equal, said line address is reset; and
thereafter testing said row counter for equality to n−1 wherein, if not equal, said row counter is incremented and said step of accessing one line is repeated, and wherein, if equal, said step of accessing all is completed.

3. The method according to claim 2 wherein each said imager has a Vmode input and an output enable input and wherein said Vmode input and said output enable input must be enabled to allow said accessing.

4. The method according to claim 3 wherein said column counter is multiplexed to generate a separate said output enable input for each said imager.

5. The method according to claim 3 wherein said row counter is multiplexed to generate a said Vmode input for each said row of said imagers.

6. The method according to claim 2 wherein said step of accessing one line of one said imager is synchronized by a horizontal clock and wherein said column counter is generated by dividing said horizontal clock by the number of bits in each said line.

7. The method according to claim 2 wherein said row counter is generated by dividing said line address by said total lines in each said imager.

8. A method of accessing an imager array, said method comprising:
providing a bi-directional bus;
providing an array of imagers arranged in n rows and m columns wherein said n and m are positive integers, wherein each said imager is connected to said bi-directional bus, wherein a line of bits of any said imager is accessible by a line address, wherein each said imager has a Vmode input and an output enable input, and wherein said Vmode input and said output enable input must be enabled to allow accessing;

initializing a column counter, a row counter, and said line address to zero; and accessing all of said array wherein said column counter is multiplexed to generate a separate said output enable input for each said imager, wherein said row counter is multiplexed to generate a said Vmode input for each said row of said imagers, and wherein said accessing comprises further steps of:

accessing one line of one said imager corresponding to said line address, said column counter, and said row counter;

thereafter testing said column counter for equality to m−1 wherein, if not equal, said column counter is incremented and said step of accessing one line is repeated and wherein, if equal, said column counter is reset;

thereafter testing said line address for equality to total lines in each said imager wherein, if not equal, said line address is incremented and said step of accessing one line is repeated, and wherein, if equal, said line address is reset; and thereafter testing said row counter for equality to n−1 wherein, if not equal, said row counter is incremented and said step of accessing one line is repeated, and wherein, if equal, said step of accessing all is completed.

9. The method according to claim 8 wherein said step of accessing one line of one said imager is synchronized by a horizontal clock and wherein said column counter is generated by dividing said horizontal clock by the number of bits in each said line.

10. The method according to claim 8 wherein said row counter is generated by dividing said line address by said total lines in each said imager.

11. A multiple imager array device comprising:

a bi-directional bus;

an array of imagers arranged in n rows and m columns wherein said n and m are positive integers, wherein each said imager is connected to said bi-directional bus, wherein a line of bits of any said imager is accessible by a line address, wherein each said imager has a Vmode input and an output enable input, and wherein said Vmode input and said output enable input must be enabled to allow accessing;

a first multiplexer having an input and a plurality of outputs wherein said input is connected to a column counter and wherein each said output is connected to said output enable input of one of said imagers; and a second multiplexer having an input and a plurality of outputs wherein said input is connected to a row counter and wherein each said output is connected to said Vmode input of each said imager in one of said rows.

12. The device according to claim 11 further comprising a divider having an input and an output wherein said input is connected to a horizontal clock signal and wherein said output is said column counter.

13. The device according to claim 12 wherein said horizontal clock signal is divided by the number of bits in each said line of bits.

14. The device according to claim 11 further comprising a divider having an input and an output wherein said input is connected to said line address and wherein said output is said row counter.

15. The device according to claim 14 wherein said line address is divided by the number of said lines in each said imager.

16. The device according to claim 11 further comprising connecting a sum of said column counter and said row counter to said input of said first multiplexer.

17. The device according to claim 11 further comprising optics overlaying said array of imagers wherein said optics overlap to cause images on adjacent said imagers to be appear continuous.

18. The device according to claim 11 wherein said imagers display data from multiple sources.

19. The device according to claim 11 wherein said bi-directional bus comprises a serial data bus.

20. The device according to claim 11 wherein said imagers comprises CMOS devices.

21. A multiple imager array device comprising:

a bi-directional bus;

an array of imagers arranged in n rows and m columns wherein said n and m are positive integers, wherein each said imager is connected to said bi-directional bus, wherein a line of bits of any said imager is accessible by a line address, wherein each said imager has a Vmode input and an output enable input, and wherein said Vmode input and said output input must be enabled to allow accessing;

a first multiplexer having an input and a plurality of outputs wherein said input is connected to a sum of a column counter and a row counter and wherein each said output is connected to said output enable input of one of said imagers;

a second multiplexer having an input and a plurality of outputs wherein said input is connected to a row counter and wherein each said output is connected to said Vmode input of each said imager in one of said rows a first divider having an input and an output wherein said input is connected to a horizontal clock signal and wherein said output is said column counter; and a second divider having an input and an output wherein said input is connected to said line address and wherein said output is said row counter.

22. The device according to claim 21 wherein said horizontal clock signal is divided by the number of bits in each said line of bits.

23. The device according to claim 21 wherein said line address is divided by the number of said lines in each said imager.

24. The device according to claim 21 further comprising optics overlaying said array of imagers wherein said optics overlap to cause images on adjacent said imagers to be appear continuous.

25. The device according to claim 21 wherein said imagers display data from multiple sources.

* * * * *